US012803397B2

(12) United States Patent
Park

(10) Patent No.: US 12,803,397 B2
(45) Date of Patent: Nov. 17, 2026

(54) ANTI-ELECTROLYTIC CORROSION CONDUCTIVE RING WITH BACKPLATE HAVING METALLIC YARN FABRIC MEMBER FOR CURRENT CONDUCTION

(71) Applicant: PYUNGHWA OIL SEAL INDUSTRY CO., LTD., Daegu (KR)

(72) Inventor: Eun Min Park, Daegu (KR)

(73) Assignee: PYUNGHWA OIL SEAL INDUSTRY CO., LTD., Daegu (KR)

( * ) Notice: Subject to any disclaimer, the term of this patent is extended or adjusted under 35 U.S.C. 154(b) by 217 days.

(21) Appl. No.: 18/405,356

(22) Filed: Jan. 5, 2024

(65) Prior Publication Data

US 2024/0364189 A1 Oct. 31, 2024

(30) Foreign Application Priority Data

Apr. 28, 2023 (KR) ........................ 10-2023-0055958

(51) Int. Cl.

*H02K 11/04* (2016.01)
*H02K 5/173* (2006.01)
*H02K 11/40* (2016.01)

(52) U.S. Cl.

CPC ............. *H02K 11/40* (2016.01); *H02K 5/173* (2013.01)

(58) Field of Classification Search

CPC .......... H02K 5/14; H02K 5/145; H02K 5/161; H02K 5/15; H02K 5/16; H02K 5/163; H02K 5/165; H02K 5/132; H02K 5/24; H02K 11/40; H02K 11/00; H02K 11/026; H02K 11/028; H02K 13/00; F16C 41/002; F16C 19/52; F16C 2380/26; H01R 39/24; H01R 4/64; H01R 39/38; H01R 39/385; H01R 39/39; H01R 39/64; H01R 2201/10; F05F 3/02

USPC .......................................................... 310/239

See application file for complete search history.

(56) References Cited

U.S. PATENT DOCUMENTS 2,254,277 A * 9/1941 Ehlers .................... H01R 39/40 310/247
3,757,164 A * 9/1973 Binkowski ................ H05F 3/02 361/221
4,997,293 A * 3/1991 Ono ...................... F16C 35/077 384/476
5,812,908 A * 9/1998 Larocca ............... H01R 13/035 399/90
5,961,222 A * 10/1999 Yabe ..................... F16C 33/586 384/477
6,628,036 B1 * 9/2003 Lynch .................. H01R 39/383 310/239
6,736,403 B2 * 5/2004 Kreutzer .............. F16J 15/3232 277/572

(Continued)

FOREIGN PATENT DOCUMENTS

KR 10-2444892 B1 9/2022

*Primary Examiner* — Maged M Almawri
(74) *Attorney, Agent, or Firm* — Paratus Law Group, PLLC

(57) ABSTRACT

An anti-electrolytic corrosion conductive ring includes a backplate located between a rotary shaft and a motor housing and fixed to the motor housing and a metallic yarn fabric member mounted to the backplate and made of metallic yarns electrically connecting the motor housing to the rotary shaft. A current induced in the rotary shaft flows to the motor housing through the metallic yarn fabric member.

10 Claims, 9 Drawing Sheets

(56) References Cited

U.S. PATENT DOCUMENTS

| | | | | |
|---|---|---|---|---|
| 7,097,362 | B2 * | 8/2006 | Inukai | C23C 4/02 384/510 |
| 7,503,697 | B2 * | 3/2009 | Tsuji | F16C 33/586 384/492 |
| 10,130,038 | B2 * | 11/2018 | Bernklau | F16J 15/3264 |
| 10,161,522 | B2 * | 12/2018 | Colineau | F16J 15/002 |
| 11,131,386 | B2 * | 9/2021 | Dahlhaus-Preussler | F16J 15/3232 |
| 11,359,724 | B2 * | 6/2022 | Wagner | F16J 15/3288 |
| 11,549,556 | B2 * | 1/2023 | Berruet | F16C 19/52 |
| 11,560,949 | B2 * | 1/2023 | Hintenlang | F16J 15/3268 |
| 11,773,908 | B1 * | 10/2023 | Kovacs | F16C 19/14 384/513 |
| 11,933,252 | B2 * | 3/2024 | Eguchi | F02M 26/11 |
| 12,152,674 | B2 * | 11/2024 | Sitko | F16C 33/7883 |
| 2003/0020338 | A1 * | 1/2003 | Hirsou | H02K 5/15 310/52 |
| 2004/0232620 | A1 * | 11/2004 | Bock | G01M 3/2869 277/320 |
| 2011/0193446 | A1 * | 8/2011 | Orlowski | H01R 39/64 310/232 |
| 2011/0204734 | A1 * | 8/2011 | Orlowski | H02K 5/10 310/85 |
| 2012/0080970 | A1 * | 4/2012 | Yin | H01B 7/29 977/773 |
| 2014/0042835 | A1 * | 2/2014 | Holzmueller | H02K 5/132 310/43 |
| 2015/0256054 | A1 * | 9/2015 | Northwall | H02K 11/40 310/68 C |
| 2018/0266483 | A1 * | 9/2018 | Shimpo | F16C 33/586 |
| 2021/0140479 | A1 * | 5/2021 | Ijima | F16C 41/04 |
| 2021/0310517 | A1 * | 10/2021 | Berruet | H01R 39/39 |
| 2021/0310518 | A1 * | 10/2021 | Berruet | F16C 41/002 |
| 2021/0310520 | A1 * | 10/2021 | Arnault | F16C 35/077 |
| 2021/0364040 | A1 * | 11/2021 | Arnault | F16C 41/002 |
| 2021/0364041 | A1 * | 11/2021 | Berruet | F16C 19/52 |
| 2023/0208257 | A1 * | 6/2023 | Hoerr | H01R 39/20 310/71 |
| 2024/0250575 | A1 * | 7/2024 | Kim | F16J 15/3284 |
| 2024/0418222 | A1 * | 12/2024 | Ishii | F16C 33/7876 |

* cited by examiner

ANTI-ELECTROLYTIC CORROSION CONDUCTIVE RING WITH BACKPLATE HAVING METALLIC YARN FABRIC MEMBER FOR CURRENT CONDUCTION

CROSS-REFERENCE TO PRIOR APPLICATION

This application claims priority to Korean Patent Application No. 10-2023-0055958 (filed on Apr. 28, 2023), which is hereby incorporated by reference in its entirety.

BACKGROUND

The present invention relates to a conductive ring mounted in a motor, and more particularly, to an anti-electrolytic corrosion conductive ring capable of preventing electrolytic corrosion of a bearing by transmitting a current induced in a shaft of a motor to a motor housing and a ground.

A driving motor, which is used as a power source for electric vehicles or hybrid vehicles, basically includes a motor housing, a stator, and a rotor. The rotor has a shaft extending along a central axis thereof, and a wire is wound around the shaft. The shaft is supported by a bearing, and extends to the outside of the motor housing to output rotational force.

Meanwhile, in the case of a driving motor configured to operate using a frequency conversion scheme due to switching of an inverter, current is induced in a shaft during operation thereof. The current induced in the shaft is discharged to a ground through a bearing. At this time, a micro-arc is generated in the bearing, which causes damage to the surface of the bearing. If this phenomenon is repeated, a lubricant film of the bearing is destroyed, and scratches are increased on the surface of the bearing, leading to loss of function of the bearing. The above problem is more serious in the case of high-capacity and high-torque driving motors.

In order to solve the above problem, Korean Patent Registration No. 10-2444892 discloses a technology in which a shaft ground ring for conductively connecting a shaft to a motor housing is mounted between the shaft and the motor housing.

The shaft ground ring includes grounding protrusions disposed along a ring body so as to be spaced apart from each other by predetermined intervals. Each grounding protrusion has one or more flow paths. In this case, the grounding protrusions are made of conductive plastic.

However, the grounding protrusions are minimally flexible because the grounding protrusions are made of conductive plastic. Therefore, if the grounding protrusions rotate in a state of contacting the shaft or the motor housing, the durability of the grounding protrusions may be deteriorated. In order to prevent this problem, the grounding protrusions need to be spaced apart from each other, and a flow path needs to be formed in each grounding protrusion.

In addition, due to the process of forming the flow path in each grounding protrusion and coupling the grounding protrusions to the ring body, a method of manufacturing the shaft ground ring is complicated and time-consuming.

SUMMARY

The present invention has been made to solve the above problems, and it is an object of the present invention to provide an anti-electrolytic corrosion conductive ring that guides a current induced in a shaft to the outside, thereby preventing damage to a bearing, preventing electrical defects in a motor, and increasing the lifespan of the motor.

In addition, it is another object of the present invention to provide an anti-electrolytic corrosion conductive ring that is easily manufactured, has high durability, and enhances contact with a housing or a shaft.

In accordance with an aspect of the present invention, the above and other objects can be accomplished by the provision of an anti-electrolytic corrosion conductive ring including a backplate located between a rotary shaft and a motor housing and fixed to the motor housing and a metallic yarn fabric member mounted to the backplate and made of metallic yarns electrically connecting the motor housing to the rotary shaft. A current induced in the rotary shaft flows to the motor housing through the metallic yarn fabric member.

In this case, the metallic yarn fabric member may include a central portion fixed to the backplate, an end portion contacting the motor housing, and another end portion contacting the rotary shaft.

Alternatively, at least a surface of the backplate may be made of a conductive material, and the metallic yarn fabric member may include an end portion contacting the backplate and another end portion contacting the motor housing.

In accordance with another aspect of the present invention, there is provided an anti-electrolytic corrosion conductive ring including a backplate located between a rotary shaft and a motor housing and fixed to the rotary shaft and a metallic yarn fabric member mounted to the backplate and made of metallic yarns electrically connecting the motor housing to the rotary shaft. A current induced in the rotary shaft flows to the motor housing through the metallic yarn fabric member.

In this case, the metallic yarn fabric member may include a central portion fixed to the backplate, an end portion contacting the motor housing, and another end portion contacting the rotary shaft.

Alternatively, at least a surface of the backplate may be made of a conductive material, and the metallic yarn fabric member may include an end portion contacting the backplate and another end portion contacting the motor housing.

The metallic yarns may be unit stainless yarns, each of which is formed by combining a plurality of stainless yarns, and the metallic yarn fabric member may be a twill weave formed by weaving the unit stainless yarns in such a manner that warps and wefts cross each other.

In this case, each of the plurality of stainless yarns may have a diameter of 10 μm to 100 μm.

The metallic yarn fabric member may be coated with a protective film made of a conductive coating material.

The protective film may be made of polyimide or silicone.

The motor housing and the rotary shaft may be connected to each other via a bearing, which is interposed therebetween and includes bearing balls, and the metallic yarn fabric member may be disposed adjacent to the bearing, whereby a current induced in the rotary shaft may be applied to the metallic yarn fabric member without being applied to the bearing balls.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Hereinafter, exemplary embodiments of the present invention will be described in detail with reference to the accompanying drawings.

An anti-electrolytic corrosion conductive ring according to an embodiment performs a grounding function of discharging a current induced in a shaft to a motor housing, thereby preventing damage to a bearing due to static electricity.

Such an anti-electrolytic corrosion conductive ring is realized by fixing a metallic yarn fabric member having a grounding function to an outer surface of a backplate. Therefore, it is possible to completely resolve inconveniences in mounting the conventional shaft ground ring. In particular, since a metallic yarn fabric is used through a cutting process, the metallic yarn fabric member is easily applied irrespective of the diameter of the shaft or a gap between the shaft and the inner circumferential surface of the motor housing. On the other hand, the conventional shaft ground ring has low applicability because it is impossible to adjust the inner diameter thereof. That is, mounting of the conventional shaft ground ring is impossible if the same does not fit the specifications of the shaft.

Figure 1:
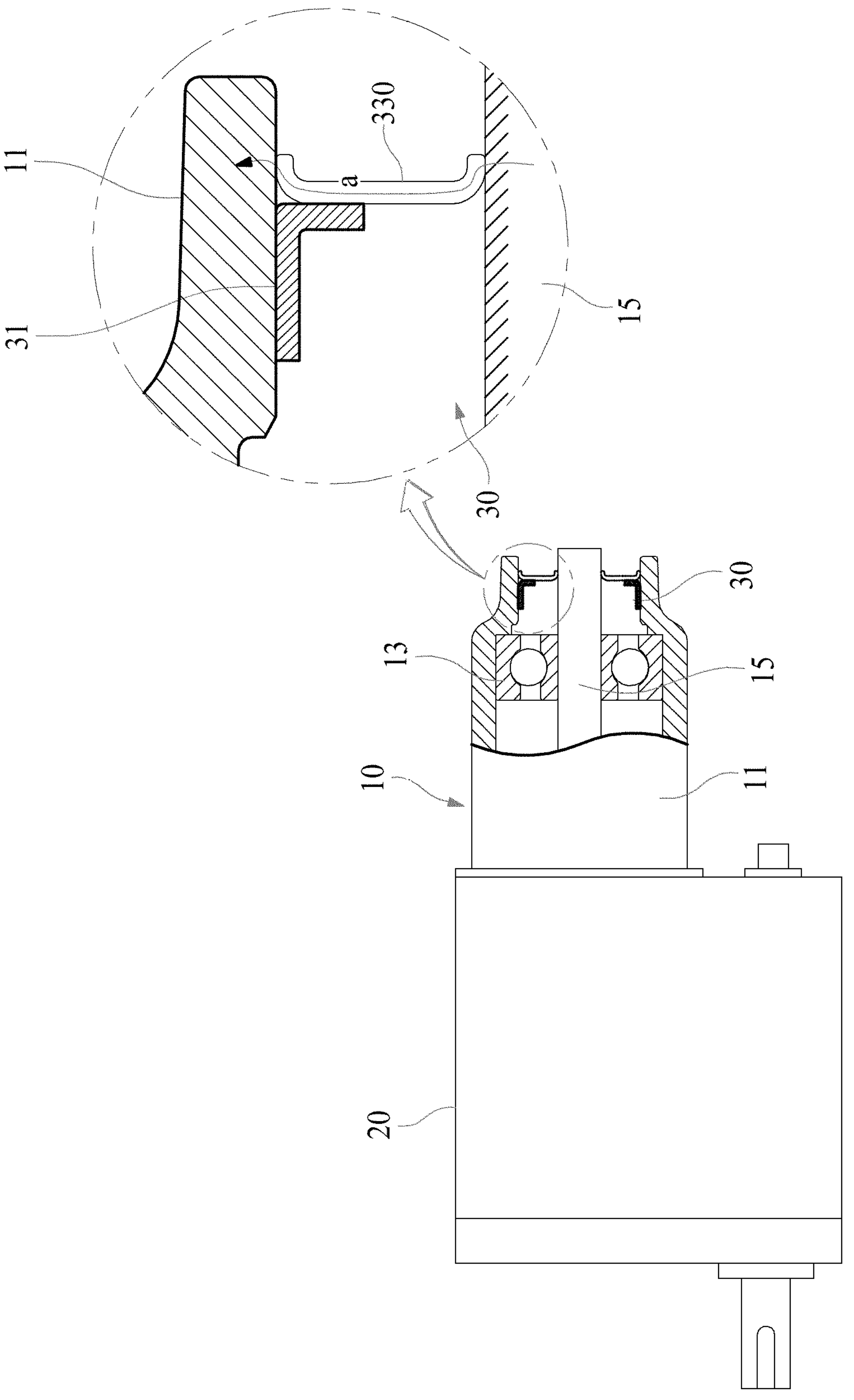
FIG. 1 is a view showing a motor to which an anti-electrolytic corrosion conductive ring according to an embodiment of the present invention is applied.
Figure 2:
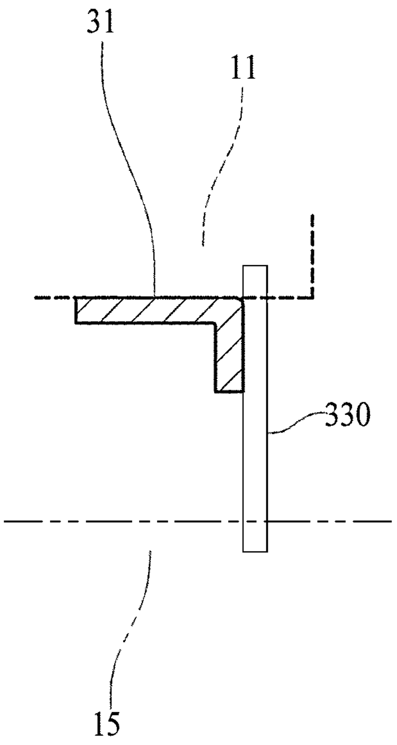
FIG. 2 is a cross-sectional view of the anti-electrolytic corrosion conductive ring shown in FIG. 1.

FIG. 1 is a view showing a motor 10 to which an anti-electrolytic corrosion conductive ring 30 according to an embodiment of the present invention is applied, and FIG. 2 is a cross-sectional view of the anti-electrolytic corrosion conductive ring 30 shown in FIG. 1.

As shown in FIG. 1, a rotary shaft 15 is mounted in a motor housing 11 constituting the motor 10. The rotary shaft 15 transmits rotational torque to a reducer 20 while axially rotating in a state of being supported by a bearing 13. One end portion of the rotary shaft 15 is exposed to the outside of the motor housing 11.

In addition, the anti-electrolytic corrosion conductive ring 30 is located beside the bearing 13.

As shown in FIG. 1, the anti-electrolytic corrosion conductive ring 30 includes a backplate 31 and a metallic yarn fabric member 330. The backplate 31 is fixed to the motor housing 11. The backplate 31 is made of a rigid material, and functions to support the metallic yarn fabric member 330, which will be described later.

The metallic yarn fabric member 330 guides electricity trapped in the rotary shaft 15 in the direction of the arrow a to discharge the electricity to the motor housing 11. As described above, if electricity remains in the rotary shaft 15, the electricity leaks to the bearing 13, particularly, bearing balls 17, leading to generation of an arc and resultant damage to the bearing 13.

The metallic yarn fabric member 330 may be fixed to the backplate 31 by adhesion.

The metallic yarn fabric member 330 is made by weaving metallic yarns. Accordingly, the shape or size of the metallic yarn fabric member 330 may be varied freely. Since the metallic yarn fabric member 330 is made by weaving metallic yarns, the metallic yarn fabric member 330 is flexible, and thus is hardly worn by friction caused by contact with the bearing that rotates. Therefore, the metallic yarn fabric member 330 has high durability.

In this case, as shown in FIGS. 1 and 2, the central portion of the metallic yarn fabric member 330 is fixed to the backplate 31, one end portion of the metallic yarn fabric member 330 is in contact with the motor housing 11, and the other end portion of the metallic yarn fabric member 330 is in contact with the rotary shaft 15. Accordingly, the current transmitted to the rotary shaft 15 flows to the motor housing 11 through the metallic yarn fabric member 330, and then escapes to the outside. Since the metallic yarn fabric member 330 is conductive, the same functions as a kind of grounding path.

Figure 3:
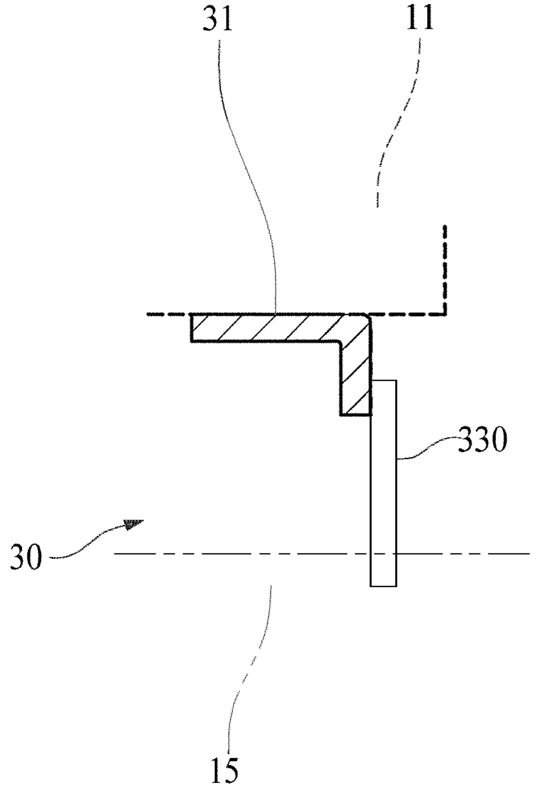
FIG. 3 illustrates a modified example of FIG. 2.

FIG. 3 illustrates a modified example of FIG. 2. As shown in FIG. 3, one end portion of the metallic yarn fabric member 330 may be in contact with the backplate 31, and the other end portion of the metallic yarn fabric member 330 may be in contact with the motor housing 15.

In this case, the backplate 31 may be made of a conductive material, for example, a metallic material such as iron, or may be implemented as a rigid body coated with a conductive material. Alternatively, a conductive object may be coupled to the surface of the backplate.

Accordingly, the current transmitted to the rotary shaft 15 flows to the motor housing 11 through the metallic yarn fabric member 330 and the backplate 31, and then escapes to the outside.

In this case, the metallic yarn fabric member 330 and the backplate 31 function as a grounding path.

Figure 4:
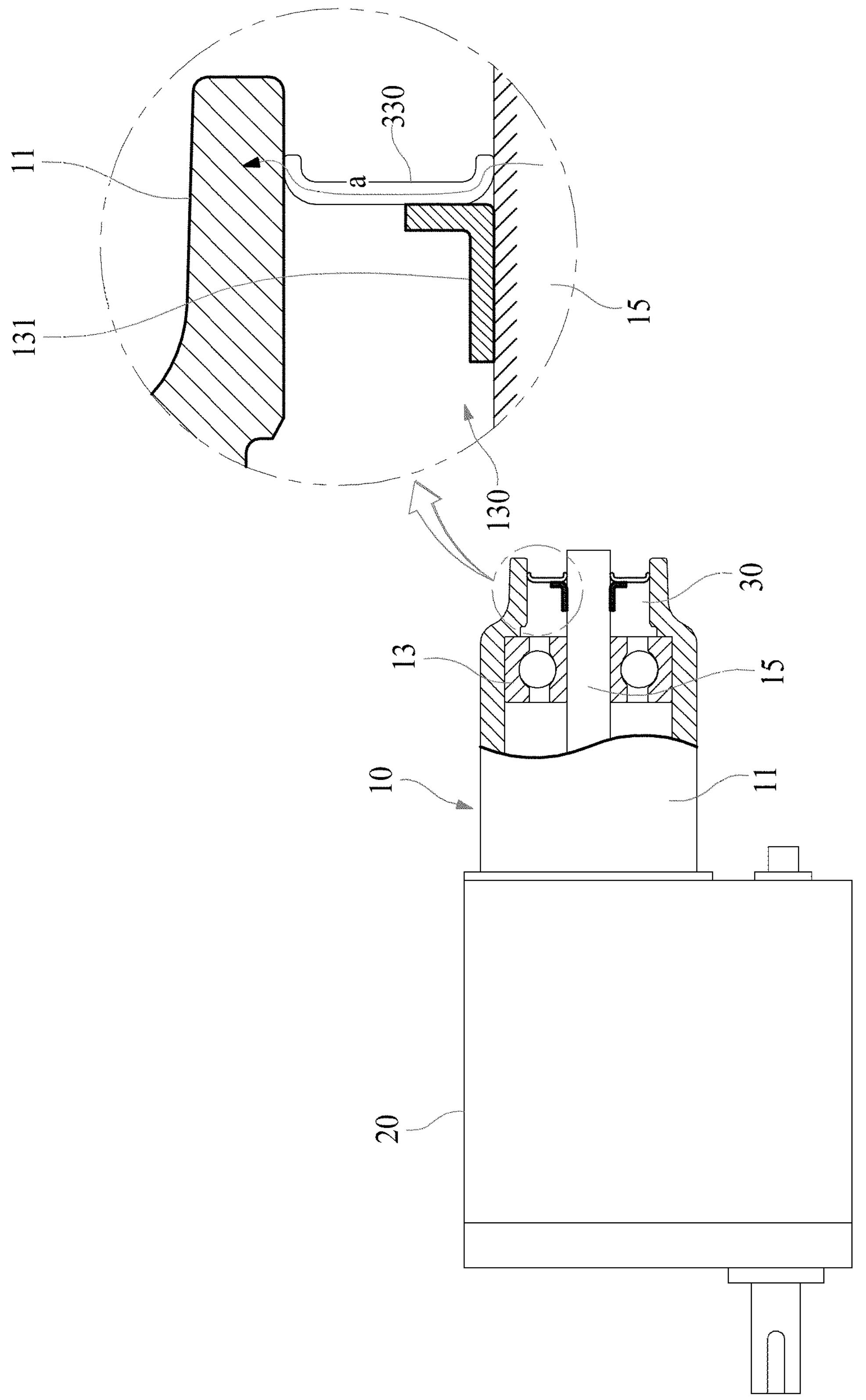
FIG. 4 illustrates another modified example of FIG. 2.

FIG. 4 illustrates another modified example of FIG. 2. As shown in FIG. 4, in an anti-electrolytic corrosion conductive ring 130 according to another embodiment of the present invention, a backplate 131 is fixed to the rotary shaft 11. That is, the anti-electrolytic corrosion conductive ring 130 includes a backplate 131, which is located between the rotary shaft and the motor housing and is fixed to the rotary shaft, and a metallic yarn fabric member 330, which is mounted to the backplate and is made of metallic yarns electrically connecting the motor housing to the rotary shaft. Therefore, the current induced in the rotary shaft 15 flows to the motor housing 11 through the metallic yarn fabric member 330.

Figure 5:
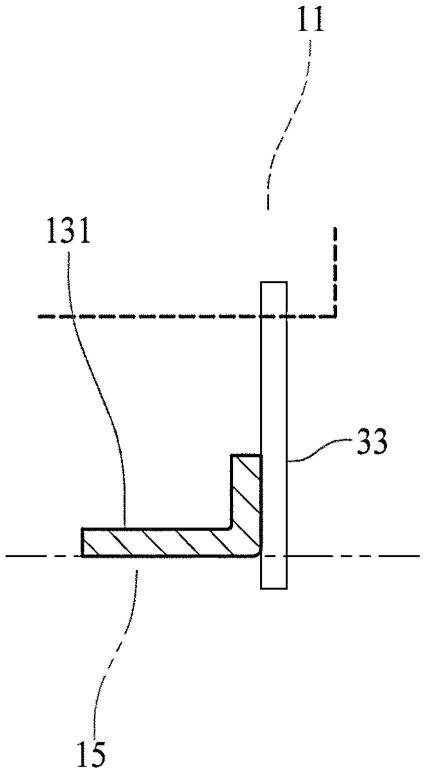
FIG. 5 is a view showing a motor to which an anti-electrolytic corrosion conductive ring according to another embodiment of the present invention is applied.

In this case, as shown in FIG. 5, the central portion of the metallic yarn fabric member 330 may be fixed to the backplate 131, one end portion of the metallic yarn fabric member 330 may be in contact with the motor housing 11, and the other end portion of the metallic yarn fabric member 330 may be in contact with the rotary shaft 15.

Figure 6:
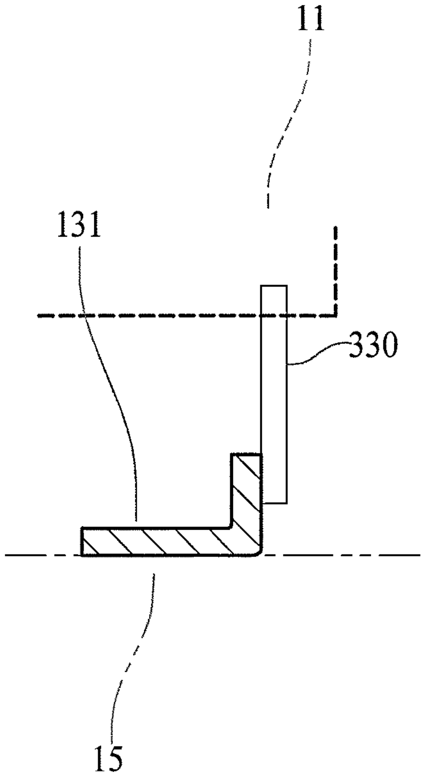
FIG. 6 is a cross-sectional view of the anti-electrolytic corrosion conductive ring shown in FIG. 5.

Unlike this, as shown in FIG. 6, one end portion of the metallic yarn fabric member 330 may be in contact with the backplate 131, and the other end portion of the metallic yarn fabric member 330 may be in contact with the motor housing 11. In this case, the backplate may be made of a conductive material. That is, the backplate may be made of a metallic material, or may be coated with a conductive material. Alternatively, a conductive object may be attached to the backplate.

Accordingly, the current induced in the rotary shaft 15 may escape to the motor housing 11 through the backplate 131 and the metallic yarn fabric member 330.

Figure 7:
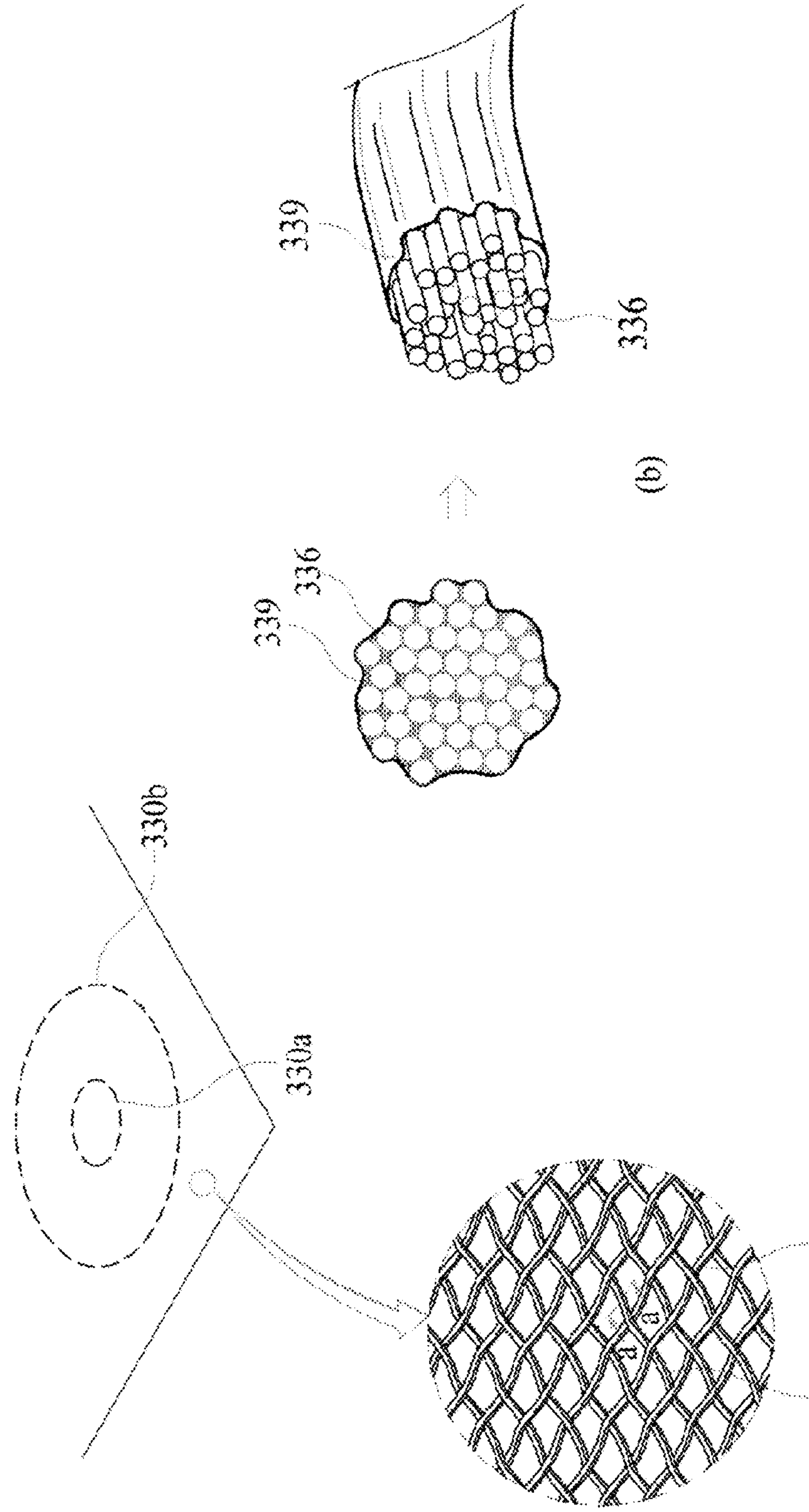
FIG. 7 is a view for explaining a principle of manufacturing a metallic yarn fabric member that is applied to the anti-electrolytic corrosion conductive ring according to the embodiment of the present invention.

The metallic yarn fabric member 330 shown in FIGS. 1 to 6 takes a form of a hollow disc having a shaft hole 330*a* formed in the center thereof, as shown in FIG. 7. The shaft hole 330*a* is a hole through which the rotary shaft passes.

The metallic yarns forming the metallic yarn fabric member 330 may be unit stainless yarns 331 and 332, each of which is formed by combining a plurality of stainless yarns 336, as shown in FIG. 7(*b*). A fabric structure is formed by weaving the unit stainless yarns. In this case, the stainless yarn 336 may have a diameter of 10 μm to 100 μm.

Figure 9:
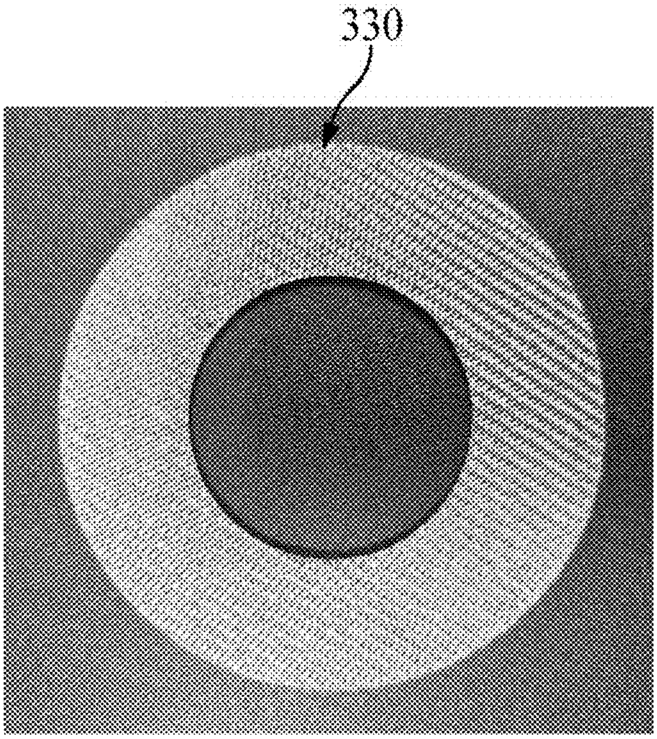
FIG. 9 is a photograph of a metallic yarn fabric member applied to the present invention.

In this case, as shown in FIGS. 7 and 9, the metallic yarn fabric member 330 may be a twill fabric formed by weaving the unit stainless yarns in such a manner that warps 331 and wefts 332 cross each other. The twill fabric is referred to as a twill weave, which has diagonal twill lines on the surface thereof. For example, as shown in FIG. 7(*a*), the twill fabric may be composed of three warps and three wefts, and may be a 2-up and 1-down (2/1) or 1-up and 2-down (1/2) twill weave.

The twill fabric has various surface structures depending on variation in twill lines. Further, because the twill fabric has a small number of weave points, the threads thereof move freely, and thus the twill fabric is highly resistant to wrinkles and is flexible. For these reasons, the twill fabric is suitable for the metallic yarn fabric member 330.

Figure 8:
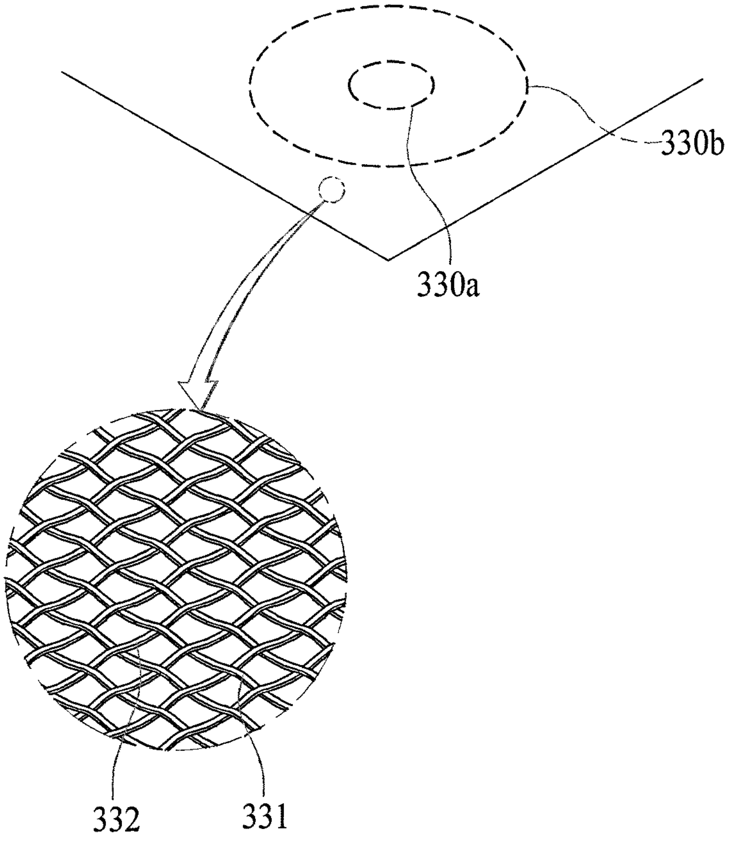
FIG. 8 illustrates a modified example of FIG. 7.

Alternatively, as shown in FIG. 8, the metallic yarn fabric member 330 according to the present invention may be a plain weave formed by weaving the unit stainless yarns 331 and 332 in such a manner that a warp and a weft cross over and under one another.

The shaft hole 330*a* and the outer peripheral portion 330*b* of the metallic yarn fabric member 330 may be formed through a cutting process using a laser or a knife.

Meanwhile, the metallic yarn fabric member may be coated with a protective film 339 made of a conductive coating material. The protective film 339 prevents the metallic yarns of the metallic yarn fabric member from unraveling after the shaft hole and the outer peripheral portion of the metallic yarn fabric member are formed through a cutting process.

In this case, the protective film 339 may be made of a polyimide or silicone coating liquid. The protective film 339 may be coated on the metallic yarn fabric member through impregnation of the metallic yarn fabric member with the coating liquid or by spraying the coating liquid onto the metallic yarn fabric member.

As is apparent from the above description, the anti-electrolytic corrosion conductive ring according to the present invention configured as described above guides a current induced in a shaft to the outside in a state of being mounted to the shaft, thereby preventing damage to a bearing, preventing electrical defects in a motor, and increasing the lifespan of the motor.

In addition, since the metallic yarn fabric member is made of metallic yarns, the metallic yarn fabric member may be used semi-permanently, and it may not be necessary to machine a motor housing in order to mount the metallic yarn fabric member.

Although specific embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. An anti-electrolytic corrosion conductive ring comprising:

a backplate located between a rotary shaft and a motor housing and fixed to the motor housing; and a metallic yarn fabric member mounted to the backplate and made of metallic yarns electrically connecting the motor housing to the rotary shaft, wherein a current induced in the rotary shaft flows to the motor housing through the metallic yarn fabric member, wherein the metallic yarns are unit stainless yarns, each being formed by combining a plurality of stainless yarns, and wherein the metallic yarn fabric member is a twill weave formed by weaving the unit stainless yarns in such a manner that warps and wefts cross each other.

2. The anti-electrolytic corrosion conductive ring according to claim 1, wherein each of the plurality of stainless yarns has a diameter of 10 μm to 100 μm.

3. The anti-electrolytic corrosion conductive ring according to claim 1, wherein the motor housing and the rotary shaft are connected to each other via a bearing interposed therebetween, the bearing comprising bearing balls, and wherein the metallic yarn fabric member is disposed adjacent to the bearing, whereby a current induced in the rotary shaft is applied to the metallic yarn fabric member without being applied to the bearing balls.

4. The anti-electrolytic corrosion conductive ring according to claim 1, wherein the metallic yarn fabric member is coated with a protective film made of a conductive coating material.

5. The anti-electrolytic corrosion conductive ring according to claim 4, wherein the protective film is made of polyimide or silicone.

6. An anti-electrolytic corrosion conductive ring comprising:

a backplate located between a rotary shaft and a motor housing and fixed to the rotary shaft; and a metallic yarn fabric member mounted to the backplate and made of metallic yarns electrically connecting the motor housing to the rotary shaft, wherein a current induced in the rotary shaft flows to the motor housing through the metallic yarn fabric member, wherein the metallic yarns are unit stainless yarns, each being formed by combining a plurality of stainless yarns, and wherein the metallic yarn fabric member is a twill weave formed by weaving the unit stainless yarns in such a manner that warps and wefts cross each other.

7. The anti-electrolytic corrosion conductive ring according to claim 6, wherein each of the plurality of stainless yarns has a diameter of 10 μm to 100 μm.

8. The anti-electrolytic corrosion conductive ring according to claim 6, wherein the motor housing and the rotary shaft are connected to each other via a bearing interposed therebetween, the bearing comprising bearing balls, and wherein the metallic yarn fabric member is disposed adjacent to the bearing, whereby a current induced in the rotary shaft is applied to the metallic yarn fabric member without being applied to the bearing balls.

9. The anti-electrolytic corrosion conductive ring according to claim 6, wherein the metallic yarn fabric member is coated with a protective film made of a conductive coating material.

10. The anti-electrolytic corrosion conductive ring according to claim 9, wherein the protective film is made of polyimide or silicone.

* * * * *